L. D. MILLS.
FILTER PRESS AND METHOD OF PREVENTING THE OXIDATION OF THE FILTRATE IN THE CONTAINERS THEREOF.
APPLICATION FILED DEC. 24, 1912.
1,236,737.
Patented Aug. 14, 1917.
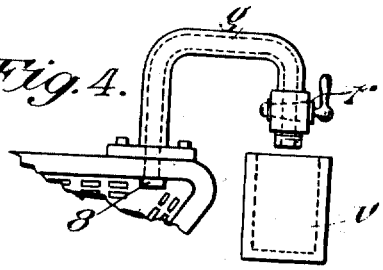
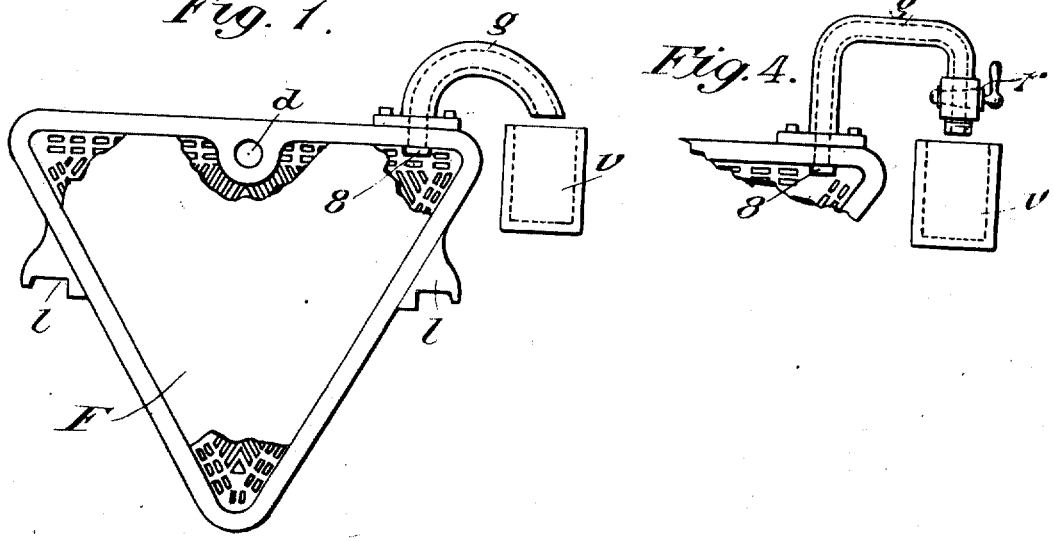
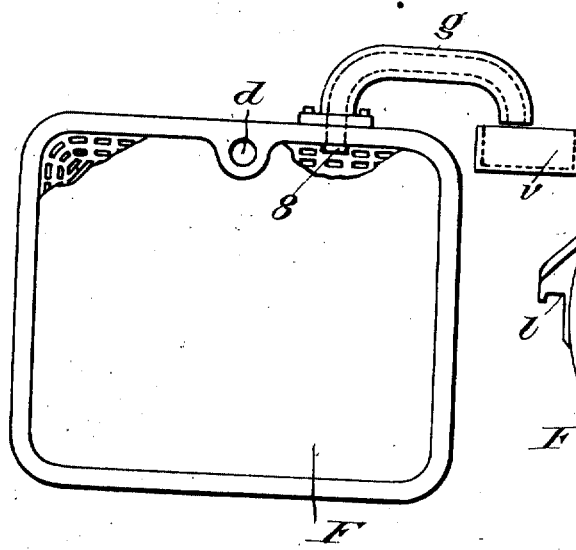
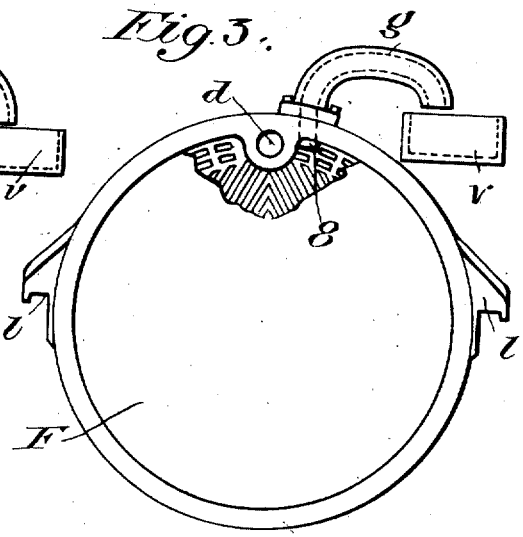

UNITED STATES PATENT OFFICE.

LOUIS DAVID MILLS, OF SAN FRANCISCO, CALIFORNIA, ASSIGNOR TO MERRILL METALLURGICAL COMPANY, A CORPORATION OF CALIFORNIA.

FILTER-PRESS AND METHOD OF PREVENTING THE OXIDATION OF THE FILTRATE IN THE CONTAINERS THEREOF.

1,236,737.  Specification of Letters Patent.  Patented Aug. 14, 1917.

Application filed December 24, 1912. Serial No. 738,449.

*To all whom it may concern:*

Be it known that I, LOUIS D. MILLS, a citizen of the United States of America, and resident of the city and county of San Francisco, State of California, have invented certain new and useful Improvements in Filter-Presses and Methods of Preventing the Oxidation of the Filtrate in the Containers Thereof, of which the following is a specification.

My invention relates to improvements in filter plates forming with suitable containers and ends a filter press for separating unfilterable material from a mixture of filterable and unfilterable matter. It particularly relates to improvements in pressure filters in which the precipitation and collection of material from hydrometallurgical solutions and the treatment of such material is effected. The principal object of the present invention is to overcome certain disadvantages which are found to exist in practice, in conducting the process aforesaid in other types of filter presses.

In various Letters Patent which have been granted for such other types of filter presses, the advantages of maintaining reducing conditions throughout the precipitation and collection of the precipitate are described; and such presses provide for the maintenance, by various suitable devices, of these reducing conditions up to the time that the mixture of solution, precipitant and precipitate, is delivered to the inlet channel of the pressure filter described and claimed as above.

Now the mechanical defects which have developed in the types of apparatus described, for example, in Letters Patent of the United States No. 987,904, granted to Charles W. Merrill are first that the flow of the mixture through some at least of the individual feed ducts of the containers, such, for instance, as are shown in Letters Patent of the United States No. 987,904 issued to Charles W. Merrill of the containers sometimes becomes impeded thus preventing the delivery of a supply of mixture adequate at all times to keep the container filled during the operation of the filter press; second, some mixtures filter so freely that the bottom discharge of the filtrate results in the press not being kept full of the mixture of filterable and unfilterable matter; third, it is not always possible in the practical operation of reduction works to deliver to the filter press continuously a sufficient feed of the mixture of filterable and unfilterable material to keep it full, and, fourth, when the filter press is not in use the practical difficulty of preventing the discharge cocks from leaking results in at least a portion of the liquid filterable portion draining out. The result of any of the above mechanical defects is that oxygen of the atmosphere occupies the space that should be filled with the mixture or its filterable component, and the effect of the contact of the oxygen with the mixture or its unfilterable component is to oxidize the precipitate and precipitant contained in the press and thus decrease the efficiency of precipitation and increase the cost of precipitation, as that portion of the latter which is oxidized is unavailable for further precipitation.

Even with the use of a port or opening at or near the top of a side of the plate a portion of the filtrate will drain out of the upper portion of the container and result in the oxidation of the precipitant and precipitate therein.

Now I have discovered that when the filtrate is discharged above the top of the plate the container is kept completely filled with solution not only during the periods of precipitation but also during the intervals between such periods when the press is not in operation.

The type of filter plates forming the subject of the present invention may be termed an upward delivery plate and will be best understood by a reference to the accompanying sheet of drawings in which Figure 1 shows an open upward delivery from the top; Fig. 2 shows the invention applied to a rectangular plate; Fig. 3, to a curvilinear plate, and Fig. 4, a view of a modification.

Similar letters refer to similar parts throughout the several views.

The filter plates are preferably of the type of construction as shown in the views which show the form of filter plate adapted to be used in connection with the forms of container of the character of those most in general use. Each filter plate is provided with an opening $d$ through which the material to be filtered is introduced, which channel or inlet is of the same general character as that in the containers and becomes continuous when the various parts are put together in the filter press, and which, with the corresponding openings in the containers hereinafter described, when placed together in the filter press, make a continuous channel provided with ports opening into each container. The surfaces of the filter plates are provided, as shown in Figs. 1, and 2, with any convenient arrangement of grooves or corrugations, preferably the arrangement described and claimed by Charles W. Merrill in Letters Patent of the United States No. 912,867.

8 8 are the outlets in each of the filter plates, as shown in Figs. 1 to 4 inclusive, which are provided for the effluent liquids, vapors or gases. They terminate in the form shown in Fig. 1 in a pipe bent in the form of a goose neck which discharges in a launder or trough $v$ of suitable dimensions. Fig. 2 shows the goose neck attached to a rectangular plate. Fig. 4 shows it attached to a curvilinear plate. Fig. 4 shows the goose neck slightly changed in form, namely, bent at two points at right angles, and provided with a discharge cock controlling the discharge therefrom. The goose neck, or the pipe, or the form of structure shown in Fig. 4 may be attached to a filter plate in any convenient manner, and may be placed at any convenient position on the top of the plate. The effect of raising the discharge on each plate and of course on the heads also, as effected by the hereinbefore described device, is to prevent the upper position of the press from standing empty and oxidizing, each time that the press is shut down, which is the result of the impracticability of maintaining absolutely continuous filtration during precipitation. In these cases the upper portion of the filter cloth is found to be nearly bare of precipitant, or if any precipitant is found, it is usually in an oxidized condition.

I claim as my invention:

1. The hereinbefore described method of preventing the oxidation of the precipitate and precipitant in the containers of opened top-discharge filter presses in which hydrometallurgical precipitation and filtration is effected, by causing the filtrate to be discharged from each filter plate at a point above the uppermost level of the mixture within the press, whereby the admission of air into the containers is prevented.

2. The hereinbefore described method of preventing the oxidation of the precipitate and precipitant in the containers of opened top-discharge filter presses in which hydrometallurgical precipitation and filtration is effected, by causing the filtrate to be separately discharged from each filter plate at a point above the uppermost level of the mixture within the press, whereby the admission of air into the containers is prevented.

3. A hydrometallurgical filter press comprising a plurality of filter plates each plate having an open discharge pipe with its discharge end above the level of the top of the filtering surface of the plate.

4. A hydrometallurgical filter press comprising a plurality of filter plates, each plate having an open discharge pipe with its discharge end above the level of the top of the filtering surface of the plate, and each discharge pipe being provided with a stop cock.

In testimony, that I claim the foregoing as my invention, I have signed my name in presence of two witnesses, this twenty-first day of November 1912.

LOUIS DAVID MILLS.

Witnesses:
L. F. HELLIER,
C. B. HENDERSON.